US010694740B2

(12) United States Patent
Bonini et al.

(10) Patent No.: US 10,694,740 B2
(45) Date of Patent: Jun. 30, 2020

(54) ADHESIVE COMPOSITION FOR JOINING FUNGUS SPORES TO THE SURFACE OF VEGETABLE SEEDS IN A STABLE MANNER AND METHOD FOR QUANTIFYING THE ADHESION CAPACITY

(71) Applicant: AGROTECNOLOGIAS NATURALES, S.L., Tarragona (ES)

(72) Inventors: Paolo Bonini, Tarragona (ES); Veronica Cristina Cirino, Tarragona (ES)

(73) Assignee: AGROTECNOLOGIAS NATURALES, S.L., Tarragona (ES)

( * ) Notice: Subject to any disclaimer, the term of this patent is extended or adjusted under 35 U.S.C. 154(b) by 283 days.

(21) Appl. No.: 15/770,284

(22) PCT Filed: Oct. 19, 2016

(86) PCT No.: PCT/ES2016/070735
§ 371 (c)(1),
(2) Date: Apr. 23, 2018

(87) PCT Pub. No.: WO2017/068218
PCT Pub. Date: Apr. 27, 2017

(65) Prior Publication Data

US 2019/0208776 A1 Jul. 11, 2019

(30) Foreign Application Priority Data

Oct. 22, 2015 (ES) .................................. 201531523

(51) Int. Cl.

| | |
|---|---|
| ***A01N 25/24*** | (2006.01) |
| ***C09J 189/00*** | (2006.01) |
| ***A01N 63/30*** | (2020.01) |
| ***G01N 21/64*** | (2006.01) |

(52) U.S. Cl.
CPC ............. *A01N 25/24* (2013.01); *A01N 63/30* (2020.01); *C09J 189/00* (2013.01); *G01N 21/6428* (2013.01); *G01N 2021/6439* (2013.01)

(58) Field of Classification Search
CPC ........ A01N 25/24; A01N 63/30; A01N 63/00; G01N 21/6428
See application file for complete search history.

(56) References Cited

U.S. PATENT DOCUMENTS 4,259,317 A 3/1981 Vesely et al.

FOREIGN PATENT DOCUMENTS

| | | |
|---|---|---|
| CN | 101926259 | 12/2010 |
| GB | 2110518 | 6/1983 |
| KR | 100773298 | 11/2007 |
| RU | 2113794 | 6/1998 |
| WO | 9107869 | 6/1991 |
| WO | 2009009805 | 1/2009 |

OTHER PUBLICATIONS

International Search Report for PCT/ES2016/070735, English Translation attached to original, Both completed by the European Patent Office dated Mar. 22, 2017, All together 5 Pages.
Helber et al. New Phytologist 2008, vol. 177, pp. 537-548, “Expression of the fluorescence markers DsRed and GFP fused to a nuclear localization signal in the arbuscular mycorrhizal fungus Glomus intraradices”.

*Primary Examiner* — Yara B Green
(74) *Attorney, Agent, or Firm* — Brooks Kushman P.C.

(57) ABSTRACT

An adhesive composition for joining fungus spores to the surface of vegetable seeds in a stable manner, characterized in that it includes an aqueous solution of fermented maize liquor and/or soya protein hydrolysates. A method and to the use of the same for quantifying the adhesion capacity by means of an indirect measurement in which fluorescent microspheres joined to the surface of seeds are quantified by means of the fluorescence microscopy technique is also disclosed. This method allows an indirect assessment of the adhesion of fungus spores to the surface of seeds in a simple manner and consequently allows the quality of the adhesive composition of the present invention to be assessed.

10 Claims, No Drawings

ADHESIVE COMPOSITION FOR JOINING FUNGUS SPORES TO THE SURFACE OF VEGETABLE SEEDS IN A STABLE MANNER AND METHOD FOR QUANTIFYING THE ADHESION CAPACITY

CROSS-REFERENCE TO RELATED APPLICATIONS

This application is the U.S. national phase of PCT Application No. PCT/ES2016/070735 filed on Oct. 19, 2016, which claims priority to ES Patent Application No. P201531523 filed on Oct. 22, 2015, the disclosures of which are incorporated in their entirety by reference herein.

TECHNICAL FIELD

The present invention belongs to the branch of agricultural sciences and specifically relates to an adhesive composition for joining fungus spores to the surface of vegetable seeds in a stable manner as well as to the method for quantifying the adhesion capacity by means of an indirect measurement in which fluorescent microspheres joined to the seed surface are quantified by means of fluorescence microscopy technology. This method enables an indirect assessment of the adhesion of fungus spores to the seed surface in a simple manner and consequently allows the quality of the adhesive composition of the present invention to be assessed. Another object of the present invention is the use of the adhesive composition of the present invention to catalyze the adhesion of fungus spores to the surface of vegetable seeds.

BACKGROUND

Mycorrhizal association is a nutritional strategy which many plants and some fungi have developed which ensures them a mutual benefit. The mycorrhizae are organs formed by the root of a plant and the mycelium of a fungus. They act as an absorption system which extends through the soil, thus providing a symbiotic relationship that is beneficial both for the plant and for the fungus. In terms of the plant, the growth thereof is facilitated (since the fungus allows the water and the required minerals to be absorbed better, stimulating the growth of the root), improvement in the absorption of phosphate and other nutrients, it is better protected from the toxic effects caused by high concentrations of determined minerals, it resists the lack of water better, it is better protected against the attack of pathogens, the rooting and growth of seedlings is stimulated, it helps to overcome environmental stress situations. In addition, the fungus receives sugars originating from photosynthesis from the plant, essentially starch.

Approximately 90% of all plant species live in symbiosis with a large quantity of fungi in the soil. This form of living in community or symbiosis (which symbolizes the mutual benefit between the plant species and the fungi) is termed mycorrhiza. Since it is such an extensive phenomenon, the term “mycorrhizae” has become the name with which fungi involved in the formation thereof have been designated, although such designation is not very orthodox. The extension of the term and colloquial habits have led to the coining of terms such as “mycorrhize”, that is to say, placing the mycorrhizal fungi into contact with plants or the term “mycorrhization” to indicate the establishment of the symbiosis.

To this end, it is known from the state of the art to use mycorrhizal fungi to provide the plants with the previously mentioned benefits as well as to use pesticide compositions, and for them to facilitate the activity of microorganisms.

Among the documents which have been found in the closest state of the art, there is the Russian patent RU2113794C1, which describes a method for preparing a microbial pesticide with bipolar cover. The described method comprises mixing a biopolymer with water, heating the mixture from 80 to 121° C. up to gel or paste formation, cooling to the temperature from room point to 60° C. The mixture comprises one of the following microorganism strains: *Bacillus subtilis krietiensis* ATCC 55078 or 55079, *Pseudomonas fluorescens* ATCC 27663, *Gliocladium* vixens ATCC 52045, *Trichoderma reesei* ATCC28217, *Trichoderma harzianum* ATCC 52445, *Trichoderma hamatum* ATCC 52198, *Trichoderma viride* ATCC 52440, *Streptomyces cacaoi asoensis* ATCC 19093, *Bacillus thuringiensis* ATCC 13367, *Beauveria bassiana* ATCC 26851, 48585 or 48023, *Hirsutella thomsonii* ATCC 24874, *Metarhizium flavoviride* ATCC 32969, *Verticillium lencanii* ATCC 46578, *Collectotrichum gloeosporioides* f. sp. *jussiaeas* ATCC 52634. The mixture obtained is formed and dried and a pesticide is prepared. Prior to mixing the cooled gel or paste (biopolymer) with the microorganisms or in the process of stabilizing the mixture, the nutrients are expediently added. The following substances may be used as biopolymers (one component), grains, tubers, root crops, starch, wax and natural resins and the derivatives thereof. The stabilizing agents: glycerol, milk, milk.

In addition, the international patent application WO9107869A1 describes a continuous coating for seeds which comprises a liquid formulation in combination with a microorganism to biologically control plant pathogens and a solid material in carbon particle form which includes soft coal, shales, moss, muck soil, activated charcoal or mixtures which protect the seed and the plant from soil-borne pathogens including *Pythium* spp. The compositions comprise the bioprotective strain *Trichoderma* 22 (ATCC n° 20847) which is particularly effective at protecting a variety of crops such as tomato, cucumber, cabbage, sugar beet, beetroot, maize field, sweetcorn, cotton, bean, green bean and soya. The composition comprises an adhesive which is within the group composed of polyvinyl alcohol, polyalkyleneoxide, polyvinyl acetate, starch, cellulose esters such as methyl cellulose and hydroxypropyl cellulose, organic silicates, including organic silicon esters, rubbers, alginate and similar.

In order to have the correct interaction between the fungi and the plants, in particular in order to achieve the positive effect of the same in stimulating and germinating the seeds, effective adhesion of the spores to the surface of the same is required which may vary depending on the species of plants and fungi. To this end, it is of great importance to develop a strategy which allows the joining of spores to seeds to be obtained in an effective and stable manner as well as to be able to quantitatively assess the efficacy of said strategy for carrying out anticipated effect monitoring.

Among the different known methods for carrying out monitoring of an anticipated effect, one of the most important methods is electronic microscopy quantification using fluorescent molecular markers that are easily traceable.

Therefore, various methods of microscopy quantification by means of the use of a wide range of fluorescent molecular markers are known in the state of the art. For example, DsRed and GFP (green fluorescent protein) have been used for marking *Rhizophagus intraradices* using a biolistic approach.

Another example is the transformation of *Agrobacterium tumefaciens* which has been recently proposed for "in vivo" monitoring of arbuscular mycorrhizal fungi during symbiotic development (Helber and Requena, 2008, New Phytologist, 177: 537 to 548). However, the authors of this publication reported that the expression of fluorescence in transformed spores was transitory and disappeared very quickly. In addition, the efficacy of the transformation mediated by *Agrobacterium* of spores of the arbuscular mycorrhizal species was very low.

However, to date, no adhesive composition has been described which catalyzes the joining of fungus spores to the surface of vegetable seeds to achieve a stable and effective joining which guarantees the symbiosis phenomenon.

As a result, a method has also not been described in the state of the art which allows the joining of said fungus spores to the surface of seeds to be systematically quantified and monitored by means of fluorescence microscopy in order to prove the efficacy of said joining. Therefore it is necessary to provide a simple and effective method which allows the adhesion of the spores of the fungi to the seeds to be quantitatively evaluated in order to determine the effectiveness of the adhesion method.

The present invention thus relates to an adhesive composition for joining fungus spores to the surface of vegetable seeds in a stable manner which comprises an aqueous solution of fermented maize liquor and/or soya protein hydrolysates.

The present invention also relates to the method for obtaining said adhesive composition as well as to the use of the composition object of the present invention for the adhesion of fungus spores to the surface of vegetable seeds.

The present invention also relates to an indirect method which allows the efficacy of the adhesive composition to be quantitatively assessed characterized in that silica or polyethylene microspheres are used that are fluorescent when they are exposed to ultraviolet (UV) light with similar characteristics to the spores in terms of the size distribution, the spherical shape, density, specific surface and affinity for surface water, owing to which the effectiveness of an adhesive composition intended for adhering fungus spores to vegetable seeds may be determined.

As a result, the present invention provides an adhesive composition of fungus spores to vegetable seeds for promoting or catalyzing the symbiosis phenomenon and the method for verifying or quantifying said adhesion which allows the quality of the adhesive composition to be assessed.

The method is very advantageous since it allows an indirect measurement of the adhesion phenomenon of fungus spores to be obtained, in particular arbuscular mycorrhizae to vegetable seeds which are preferably cereal seeds.

Another advantage of the present invention, in addition to avoiding the use of organisms, in particular genetically modified organisms, is that the fluorescent microspheres present fluorescence in the ultraviolet (UV) spectrum which is a much more stable fluorescence than if arbuscular mycorrhizal spores were used which express fluorescent markers.

The present invention has an important practical application since it provides an adhesive composition for joining fungus spores to the surface of vegetable seeds in a stable manner which comprises an aqueous solution of fermented maize liquor and/or soya protein hydrolysates and it provides a simple and reliable quantitative method for determining the effectiveness of said adhesive composition in the adhesion of fluorescent microspheres to the vegetable seeds and based on the result obtained the effectiveness of said composition for the adhesion of fungus spores, with similar characteristics to the fluorescent microspheres, can be inferred.

SUMMARY

The present invention relates to an adhesive composition for joining fungus spores to the surface of vegetable seeds in a stable manner which comprises an aqueous solution of fermented maize liquor and/or soya protein hydrolysates.

For the object of the present invention, "join in a stable manner" is understood as any action or putting a method into practice which allows a material joining (fungus spores) to the surface of a medium (vegetable seeds) selected from the group formed by: adsorption method, covalent bond method, cross-linking and auto-immobilization method, method for joining by means of hydrogen bridges and method for van der Waals force bonding.

The present invention also relates to the method for obtaining said adhesive composition as well as to the use of the composition object of the present invention for the adhesion of fungus spores to the surface of vegetable seeds.

The present invention also relates to an indirect method which allows the adhesion efficacy or capacity of the adhesive composition to be quantitatively assessed characterized in that silica or polyethylene microspheres are used that are fluorescent when they are exposed to ultraviolet (UV) light with similar characteristics to the spores in terms of the size distribution, the spherical shape, density, specific surface and affinity for surface water, owing to which the effectiveness of an adhesive composition intended for adhering fungus spores to vegetable seeds may be determined.

As a result, the present invention provides an adhesive composition of fungus spores to vegetable seeds for promoting or catalyzing the symbiosis phenomenon and the method for verifying or quantifying said adhesion which allows the quality of the adhesive composition to be assessed.

The method is very advantageous since it allows an indirect measurement of the adhesion phenomenon of fungus spores to be obtained, in particular arbuscular mycorrhizae to vegetable seeds which are preferably cereal seeds.

The present invention has an important practical application since it provides an adhesive composition for joining fungus spores to the surface of vegetable seeds in a stable manner which comprises an aqueous solution of fermented maize liquor and/or soya protein hydrolysates and it provides a simple and reliable quantitative method for determining the effectiveness of said adhesive composition in the adhesion of fluorescent microspheres to the vegetable seeds and based on the result obtained the effectiveness of said composition for the adhesion of fungus spores, with similar characteristics to the fluorescent microspheres, can be inferred.

The present invention also proposes a novel method for indirectly quantifying the adhesion capacity of fungus spores to the surface of seeds, particularly arbuscular mycorrhizal seeds and is based on the use of an adhesive composition which comprises protein carbohydrates and/or protein hydrolysates to which fluorescent microspheres are added.

The peculiarity of the fluorescent microspheres which are used in the present invention is that they are produced from silica, being transparent when they are exposed to daylight, while they emit fluorescence with a yellow-green color when they are exposed to ultraviolet (UV) light corresponding to a wavelength of 365 nm. Said fluorescent spheres are not object of the present invention, but rather they are obtained on the market and are considered known by a person skilled in the art.

The method is based on the fact that the microspheres that are fluorescent to UV light have similar characteristics to the spores of the mycorrhizae, in terms of size distribution, spherical shape, density, specific surface and their affinity for surface water. Specifically, the microspheres used in the present invention have a density of 0.98 g/cm$^3$ and a particle size range of 1-120 microns.

The mycorrhizae are preferably arbuscular mycorrhizae *Rhizophagus intraradices* and *Funneliformis mosseae.*

The adhesive composition comprises between 1 and 10 g of fermented maize liquor and/or 3 to 30 ml of soya protein hydrolysate in a volume of between 50 and 100 ml of water.

The adhesive composition is preferably a liquid composition which is prepared by means of method of simple mixing and continuous stirring of 1 and 10 g of fermented maize liquor and/or 3 to 30 ml of soya protein hydrolysate in a volume of between 50 and 100 ml of water to dissolution.

In a preferred manner, but not limiting the invention, the method for preparing the adhesive composition comprises the following steps:

a. -) taking between 1 and 10 g of fermented maize liquor and/or 5 to 30 ml of soya protein hydrolysate, b. -) mixing with a volume of 50 ml of water, c. -) stirring to complete homogenization, and d. -) Adding sterile water whilst stirring to a final volume of 100 ml of final adhesive composition, obtaining the adhesive composition object of the present invention.

The method for indirectly quantifying the adhesion capacity of fungus spores to the surface of vegetable seeds by means of an adhesive composition and fluorescent microspheres of the present invention comprises the following steps:

a. -) taking the adhesive composition of the present invention, b. -) mixing the adhesive composition of step a) with silica or polyethylene fluorescent microspheres with a particle size of between 1-120 microns and continuing to stir, c. -) placing the vegetable seeds into contact with the mixture of step b), d. -) drying the seeds at room temperature, e. -) obtaining images of the fluorescent microspheres adhered to the seeds by fluorescence microscopy, exposing them to ultraviolet (UV) light corresponding to a wavelength of 365 nm, and f. -) counting the fluorescent microspheres adhered to the seeds based on the images obtained in step e).

According to a preferred aspect, step c) is implemented by submerging the vegetable seeds in the mixture of step b) in a receptacle in a volumetric ratio (seeds:final volume) of 1:3, continuing to stir the mixture for at least 1 minute between 50 and 100 rpm, concluding with decantation and removing the excess liquid from the seeds.

According to another preferred aspect, step c) is carried out by spraying the mixture of step b) on the vegetable seeds in a homogenous manner using a proportion of 1 l of mixture per 100 kg of seeds.

The adhesive composition of the present invention is preferably, but not limited to, an aqueous solution which comprises soya protein hydrolysate and/or fermented maize liquor.

The quantities of the components of the present adhesive composition according to the preferred embodiment are the following: soya protein hydrolysate between 5 to 30 ml and water to complete a final volume of 100 ml; fermented maize liquor between 1 to 10 g and water to complete a final volume 100 ml or soya protein hydrolysate between 3 to 30 ml, fermented maize liquor between 1 to 10 g and water to complete a final volume of 100 ml.

An adhesive composition for joining fungus spores to the surface of vegetable seeds is an object of the invention which comprises an aqueous solution of fermented maize liquor and/or soya protein hydrolysates.

According to a significant aspect, the adhesive composition comprises from 3 to 30 ml of soya protein hydrolysate and/or 1 to 10 g of fermented maize liquor in water to complete a final volume of 100 ml.

Another object of the present invention is a method for preparing the previously cited adhesive composition which comprises the following steps:

a. -) taking between 1 and 10 g of fermented maize liquor and/or 3 to 30 ml of soya protein hydrolysate, b. -) mixing with a volume of 50 ml of water, c. -) stirring to complete homogenization, and d. -) adding sterile water whilst stirring to a final volume of 100 ml of final adhesive composition.

Another object of the present invention is a method for quantifying the adhesion capacity to the surface of vegetable seeds of fluorescent microspheres by means of the adhesive composition of the invention where the microspheres represent the fungus spores which comprise the following steps:

a. -) taking the adhesive composition of the present invention, b. -) mixing the adhesive composition of step a) with silica or polyethylene fluorescent microspheres with a particle size of between 1-120 microns and continuing to stir, c. -) placing the vegetable seeds into contact with the mixture of step b), d. -) drying the seeds at room temperature, e. -) obtaining images of the fluorescent microspheres adhered to the seeds by fluorescence microscopy, exposing them to ultraviolet (UV) light corresponding to a wavelength of 365 nm, and f. -) counting the fluorescent microspheres adhered to the seeds based on the images obtained in step e).

According to a preferred aspect, step c) is implemented by submerging the vegetable seeds in the mixture of step b) in a receptacle in a volumetric ratio (seeds:final volume) of 1:3, continuing to stir the mixture for at least 1 minute between 50 and 100 rpm, concluding with decantation and removing the excess liquid from the seeds.

According to another preferred aspect, step c) is carried out by spraying the mixture of step b) on the vegetable seeds in a homogenous manner using a proportion of 1 l of mixture per 100 kg of seeds.

According to a preferred aspect, the microspheres have a density of 0.98 g/cm$^3$ and a particle size range of 1-120 microns.

According to a preferred aspect, the quantification method is suitable for cereal seeds.

According to a preferred aspect, the quantification method is suitable for arbuscular mycorrhizal spores of the genera *Rhizophagus intraradices* and *Funneliformis mosseae.*

Another object of the present invention is the use of the adhesive composition of the present invention for catalyzing the adhesion of fungus spores to the surface of vegetable seeds.

Another object of the present invention is the use of the adhesive composition of the present invention for catalyzing the adhesion of arbuscular mycorrhizal spores of the genera *Rhizophagus intraradices* and *Funneliformis mosseae.*

EXEMPLARY EMBODIMENTS

The following examples are embodiments of the present invention, but are not limiting of the same.

Example 1. Obtaining the Adhesive Composition of the Present Invention

For the following example, three batches of 3 adhesive compositions have been made:

Sample 1: 15 ml of soya protein hydrolysate and water to complete a final volume of 100 ml of composition.

Sample 2: 4 grams of fermented maize liquor and water to complete a final volume of 100 ml.

Sample 3: Control sample (A) consisting of sterile water.

All the samples were obtained by the following method:

a. -) taking a suitable quantity of fermented maize liquor and/or soya protein hydrolysate, b. -) mixing with a volume of 50 ml of water, c. -) stirring to complete homogenization, and d. -) adding sterile water whilst stirring to a final volume of 100 ml of final adhesive composition.

Example 2. Method for Quantifying Fluorescent Microspheres Adhered to the Surface of the Seeds by Means of an Adhesive Composition Based on Soya Protein Hydrolysate The following example represents a proof of concept for the efficacy of the adhesive composition corresponding to Sample 1 of example 1.

The steps carried out for quantifying by fluorescence were the following:

a. -) taking Sample 1, b. -) adding 36 mg of fluorescent microspheres and stirring to complete homogenization, c. -) submerging the seeds to be treated in the mixture of the previous step, in a bottle with a lid in a volumetric proportion of 1:3 (volume of seeds:final volume), continuing to stir for at least 1 minute between 50 and 100 rpm and decanting the liquid and removing the excess and keeping the seeds, d. -) drying the seeds at room temperature, e. -) obtaining images by fluorescence microscopy, exposing the dry seeds to UV light, and f. -) counting the microspheres adhered to the seeds based on the images obtained in the previous step.

At this point, in order to be able to assess the adhesion capacity, the seeds are placed in a container with a lid with a capacity equal to 300 ml and continued to be stirred for 15 minutes between 50 and 100 rpm with the aim of evaluating the adhesion force of the microspheres on the surface of the seed. Then, the seeds are removed from the container, they are dried at room temperature and images are again obtained by fluorescence microscopy, exposing the seeds to UV light in order to count the microspheres adhered to the seeds based on the images obtained in the previous step and thus to be able to calculate the percentage of microspheres joined to the seed after stirring by means of the following mathematical formula:

Microspheres of seeds after stirring×100

Microspheres of seeds prior to stirring

Thus the percentage value of the microspheres adhered to the surface of the seeds is obtained after an aggressive stirring process.

Example 3. Method for Quantifying Fluorescent Microspheres Adhered to the Surface of the Seeds by Means of an Adhesive Composition Based on Fermented Maize Liquor The following example represents a proof of concept of the efficacy of the adhesive composition corresponding to Sample 2 of example 1.

a. -) taking Sample 2, b. -) adding 36 mg of fluorescent microspheres and stirring to complete homogenization, c. -) spraying, by means of the spraying method, the mixture of step b) on the vegetable seeds in a homogenous manner using a proportion of 11 of mixture per 100 kg of seeds, d. -) drying the seeds at room temperature, e. -) obtaining images by fluorescence microscopy, exposing the dry seeds to UV light, and f. -) counting the microspheres adhered to the seeds based on the images obtained in the previous step.

At this point, in order to be able to assess the adhesion capacity, the seeds are placed in a container with a lid with a capacity equal to 300 ml and continued to be stirred for 15 minutes between 50 and 100 rpm with the aim of evaluating the adhesion force of the microspheres on the surface of the seed. Then, the seeds are removed from the container and images are again obtained by fluorescence microscopy, exposing the seeds to UV light in order to count the microspheres adhered to the seeds based on the images obtained in the previous step and thus to be able to calculate the percentage of microspheres joined to the seed after stirring by means of the following mathematical formula Microspheres of seeds after stirring×100

Microspheres of seeds prior to stirring

Thus the percentage value of the microspheres adhered to the surface of the seeds is obtained after an aggressive stirring process.

Example 4. Comparative Example for Assessing the Adhesion Capacity of the Adhesive Composition on Cereal Seeds In the experiments of examples 2 and 3, a total of 300 wheat, maize and soya seeds were used in each experiment and they were distributed in groups of 100 seeds per each class. Additionally, a control experiment was carried out following the same steps of examples 2 and 3, but substituting the adhesive composition for sterile water as a manner of control, that is to say using Sample 3 as the control sample. Each experiment was carried out three times.

Table 1 shows the number of fluorescent microspheres adhered to the surface of the seeds (averages and standard deviations) prior to and after washing the seeds with aggressive stirring. The percentages of microspheres joined to the surface of the seeds after aggressive agitation with respect to the number of microspheres joined to the surface of the seeds after normal agitation are shown in parentheses; that is to say, the percentages for retaining fluorescent microspheres after aggressive agitation are shown between parentheses.

TABLE 1

| | Wheat | | Maize | | Soya | |
|---|---|---|---|---|---|---|
| | Prior to stirring | After stirring | Prior to stirring | After stirring | Prior to stirring | After stirring |
| A (control) | 5.3 ± 0.1[a] | 2.0 ± 0.1 (38) | 29.3 ± 1.0 | 18.9 ± 1.3 (64) | 26.3 ± 1.2 | 20.7 ± 1.3 (78) |
| Sample 1 | 13.0 ± 0.3 | 9.2 ± 0.2 (71) | 66.0 ± 3.1 | 57.5 ± 2.8 (87) | 67.4 ± 3.7 | 62.9 ± 3.5 (93) |
| Sample 2 | 12.5 ± 0.4 | 9.7 ± 0.3 (78) | 65.8 ± 4.4 | 57.6 ± 2.6 (87) | 68.4 ± 2.9 | 64.8 ± 3.0 (95) |

After carrying out this experiment, it was observed that the adhesion capacity of the adhesive composition meant that the percentage of seeds maintaining the fluorescent microspheres adhered after the aggressive stirring process was significantly higher than in the control samples.

The invention claimed is:

1. A method for quantifying the adhesion capacity of fluorescent microspheres to the surface of vegetable seeds by means of an adhesive composition, characterized in that it comprises the following steps:

a) taking an adhesive composition comprising an aqueous solution of corn steep liquor and/or soya protein hydrolysates, b) mixing the adhesive composition of step a) with silica or polyethylene fluorescent microspheres with a particle size of between 1-120 microns and continuing to stir, c) placing the vegetable seeds into contact with the mixture of step b), d) drying the seeds at room temperature, e) obtaining images of the fluorescent microspheres adhered to the seeds by fluorescence microscopy, exposing them to ultraviolet (UV) light corresponding to a wavelength of 365 nm, and f) counting the fluorescent microspheres adhered to the seeds based on the images obtained in step e).

2. The method according to claim 1, wherein the adhesive composition comprises from 3 to 30 ml of soya protein hydrolysate and/or 1 to 10 g of corn steep liquor in water to complete a final volume of 100 ml.

3. The method according to claim 1 wherein step c) is implemented by submerging the vegetable seeds in the mixture of step b) in a receptacle in a volumetric ratio (seeds:final volume) of 1:3, continuing to stir the mixture for at least 1 minute between 50 and 100 rpm, concluding with decantation and removing the excess liquid from the seeds.

4. The method according to claim 1, wherein in that step c) is carried out by spraying the mixture of step b) on the vegetable seeds in a homogenous manner using a proportion of 11 of mixture per 100 kg of seeds.

5. The method according to claim 1, wherein the microspheres have a density of 0.98 g/cm$^3$ and a particle size range of 1-120 microns.

6. The method according to claim 1, wherein said vegetable seeds are cereal seeds.

7. A method for catalyzing the adhesion of fungus spores characterized in that it comprises the addition of an adhesive composition comprising an aqueous solution of corn steep liquor and/or soya protein hydrolysates to the surface of vegetable seeds.

8. The method according to claim 7, wherein said adhesive composition comprises from 3 to 30 ml of soya protein hydrolysate and/or 1 to 10 g of corn steep liquor in water to complete a final volume of 100 ml.

9. The method according to claim 7, wherein said fungus spores are arbuscular mycorrhizae spores.

10. The method according to claim 7, wherein said arbuscular mycorrhizae spores are of the genera *Rhizophagus intraradices* and *Funneliformis mosseae.*

* * * * *